(12) United States Patent
Ruiz Garcia (10) Patent No.: US 9,173,340 B2
(45) Date of Patent: Nov. 3, 2015

(54) PRODUCT DOSING SYSTEM FOR AGRICULTURAL MACHINES

(71) Applicant: FERRUZ PEREZ, Jose Luis, Cartuja Baja (Zaragoza) (ES)

(72) Inventor: Fernando Ruiz Garcia, Cartuja Baja (ES)

(73) Assignee: JOSE LUIS FERRUZ PEREZ, Artuja Baja (Zaragoza (ES)

(*) Notice: Subject to any disclaimer, the term of this patent is extended or adjusted under 35 U.S.C. 154(b) by 0 days.

(21) Appl. No.: 14/257,057

(22) Filed: Apr. 21, 2014

(65) Prior Publication Data
US 2015/0021365 A1    Jan. 22, 2015

(30) Foreign Application Priority Data

Jul. 19, 2013  (ES) .................................. 201331099

(51) Int. Cl.
| A01C 15/16 | (2006.01) |
| A01C 19/04 | (2006.01) |
| A01C 15/00 | (2006.01) |
| A01C 15/06 | (2006.01) |

(52) U.S. Cl.
CPC .............. *A01C 19/04* (2013.01); *A01C 15/003* (2013.01); *A01C 15/006* (2013.01); *A01C 15/06* (2013.01)

(58) Field of Classification Search
CPC ...... A01C 19/04; A01C 15/06; A01C 15/006; A01C 15/003; A01C 15/18
USPC ................. 222/618, 613, 614, 620, 623, 624; 414/518
See application file for complete search history.

(56) References Cited

U.S. PATENT DOCUMENTS

| 1,282,139 | A | * | 10/1918 | Targosky | 111/178 |
| 2,369,983 | A | * | 2/1945 | Rodli et al. | 222/615 |
| 2,759,637 | A | * | 8/1956 | Gandrud | 222/135 |
| 3,019,945 | A | * | 2/1962 | Pattillo | 222/615 |
| 3,670,962 | A | * | 6/1972 | Johnston | 239/62 |
| 3,889,853 | A | * | 6/1975 | Ribouleau | 222/615 |
| 3,982,671 | A | * | 9/1976 | Curl | 222/618 |
| 4,522,340 | A | * | 6/1985 | Gandrud | 239/654 |
| 4,779,776 | A | * | 10/1988 | Erazo et al. | 222/615 |

FOREIGN PATENT DOCUMENTS

FR  2.222.289  10/1974

OTHER PUBLICATIONS

European Search Report issued Oct. 30, 2014 in corresponding European Application 14 16 5607.

* cited by examiner

Primary Examiner — J. Casimer Jacyna
Assistant Examiner — Benjamin R Shaw
(74) Attorney, Agent, or Firm — Wenderoth, Lind & Ponack, L.L.P.

(57) ABSTRACT

Product dosing system for agricultural machines, in particular for fertilizer distributors such that the simple salts carrying nutrients, that is to say, nitrogen, potassium and phosphorus, can be arranged in granulated form in respective deposit hoppers aligned in the advance direction of the fertilizing machine to directly distribute the single fertilizer to the soil to be fertilized, as well as having an auger 8 for regulating the single fertilizer for its conduction towards collection and distribution dosing means, thus, having an auger for regulating the doses of single fertilizer in granulated form and dosing means for each of the hoppers, allowing the regulation and measurement speed to depend on the advance speed of the machine, the machine having to that end a ground engaging member through which the movement is transmitted to the regulating augers and to the axles of the collection and distribution dosing machines.

11 Claims, 9 Drawing Sheets

PRODUCT DOSING SYSTEM FOR AGRICULTURAL MACHINES

OBJECT OF THE INVENTION

The following invention, as the heading of the present specification says, relates to a product dosing system for agricultural machines, in particular for fertilizer distributors and having as first objective to be able to arrange the simple salts carrying nutrients, that is to say, nitrogen, potassium and phosphorus, in granulated form in respective deposit hoppers aligned in the advance direction of the fertilizing machine to directly distribute the single fertilizer to the soil to be fertilized.

A second objective of the invention is having an auger for regulating the simple salts carrying fertilizer nutrients ("single fertilizer") for its conduction towards collection and pouring dosing means, thus, having an auger for regulating the doses of single fertilizer in granulated form and dosing means for each of the hoppers.

A third objective of the invention is to get the regulation and measurement speed to depend on the advance speed of the machine, the machine having to that end ground engaging means, known as field wheel, through which the movement is transmitted to the regulating augers and to the axles of the collection and pouring dosing machines.

A fourth objective of the invention is having means for regulating the delivery of the granulated doses of "single fertilizer" to the regulating auger.

TECHNICAL FIELD

In the present specification, a product dosing system in agricultural machines is described, being of special application in fertilizing machines to be able to directly fertilize the soil with "single fertilizer" without needing to mix the same with inert matter.

BACKGROUND OF THE INVENTION

As it is known, the fertilizing technique for the crops has suffered a great evolution, due to the pass of time and the great industrialization of agriculture, since the random manual fertilization, whereby the farmer use to carry the fertilizer and go across the land to extend the fertilizer manually, not having any means to regulate the distribution of the fertilizer, until now, when the fertilizer is carried by corresponding fertilizing machines having means to regulate the fertilizer.

Thus, with the pass of time and industrialization, fertilizing machines started taking care of the soil fertilization, machines that have a hopper for placing the fertilizer and in which the previously prepared fertilizer is poured having mixed the "single fertilizer" with inert matter, being able to evaluate the inert matter in a 66% percentage.

In this way, according to the characteristics and necessities of the soil to be fertilized, the "commercial" fertilizer is acquired homogeneously mixed with inert matter so it can be poured into the hopper and then spread across the soil to be fertilized.

In addition, with the intention of optimizing the fertilization with the automatic system, regulation means were provided with the intention of being able to pour the suitable and precise amount according to the soil necessities, whose means can be based in a pinion set with a relatively low number of options, which are not really effective for the fertilization to be performed.

Moreover, the regulation activating means can be obtained in different ways and, thus, it can be obtained from the rear ground engaging axle of the driving vehicle or from the hydraulic system of the vehicle itself, so that, in both cases, since the regulating means of the fertilizing machine depend on the characteristics of the driving vehicle (rear wheel diameter or force), when the machine is pulled by a different driving vehicle, as can usually be the case, the regulating means will have to be adapted to said new characteristics, which is a serious disadvantage.

On the other hand, according to what has been said until now, the fertilizer mixture prepared by the manufacturer is stored in sacks for its transportation and sale, thus, arising different disadvantages, such as:
  since the prepared mixture is sacked with inert matter, and not only the "single fertilizer", bigger sacks are needed that occupy more space;
  since there is various pieces of land to fertilize because of their particular characteristics, the percentages of the fertilizer components could be variable and, thus, some pieces of land could need a high percentage of nitrogen and a low percentage of phosphorus and potassium and in others the percentage of nitrogen will have to be low and the percentages of phosphorus and potassium will be higher, such that to cover this variable necessity of the different components of single fertilizer, it is required to have a diversity of preparations to be used depending on the necessities of the land, requiring a bigger economic and time investment, and;
  the regulation, based on a pinion set, is carried out manually needing to disassemble the tensioners, regulate the pinion set and suitably rearrange the tensioners, which requires a considerable amount of time.

DESCRIPTION OF THE INVENTION

With the intention of solving the indicated disadvantages, a product dosing system for agricultural machines is described in the present specification, in particular for fertilizer distributors of the kind comprising at least:
  a reservoir for storing the fertilizer mixture to be distributed;
  dosing means for the fertilizer to be distributed, and;
  ground engaging means, associated to the machine itself, for the transmission of movement to a dosing auger,
such that the dosing system comprises:
  at least one reservoir divided in three independent hoppers for storing each a different type of "single fertilizer";
  ground engaging means associated to the agricultural machine itself that transmit the rotary movement to a crank disk to which respective connecting rods are linked;
  a regulating auger associated to each one of the hoppers, to which the displacement of the corresponding connecting rod transmits rotary movement associated to the respective crank disk to which movement is transmitted from the ground engaging means;
  guiding means for the connecting rods, associated to the corresponding regulating auger, arranged with respect to a slanted hole of the connecting rod;
  dosing means associated to each one of the hoppers, positioned in a housing in which the regulated product is poured, delivered to the corresponding regulating auger, which dosing means are defined by a first axle with groups of dosing wheels provided, in their periphery, with a plurality of notches or cuts, rotary movement being transmitted to the first axle from the respective crank disk;

a circular crown body with an internal gearing integrally joined to the respective crank disk, in eccentric position;

a disc body associated to the circular crown body, also in eccentric position to the respective crank disk;

a pinion, associated to the corresponding connecting rod, which engages with the internal gearing of the circular crown body, said pinion being coupled to the eccentric disc body;

a pair of racks integrally associated with the corresponding connecting rod, one on each side, into which a third and fourth gearwheels respectively engage, so that during the vertical up and down displacement of the connecting rod the gearwheels alternately rotate in opposed directions, and;

means for regulating the position of the pinion, associated to the corresponding connecting rod, with respect to the circular crown body into which it engages, varying the alternative stroke of the connecting rod and the dose of "single fertilizer" to be distributed.

Each one of the hoppers, materialized in each one of the deposit bodies and into which each one of the essential components of the fertilizer (single fertilizer) is placed, is associated to a regulating auger and to dosing means.

On the other hand, the ground engaging means, based on a "field wheel", associated to the machine itself, transmit movement to a crank disk, by means of axles and gears, and to whose crank disk a connecting rod is linked, such that the transmission of the rotary movement remains linked to the machine itself, being independent from the pulling driving vehicle of the same.

The regulating auger section associated to each one of the hoppers for placing the "single fertilizer" presents two helical flanges turning in opposite directions transporting product towards two different dosing means.

The notches or cuts axially made in the periphery of the series of dosing discs materialize the housings to collect the "single fertilizer" granules placed inside the storage housing of the same by the regulating auger for their pouring to the surface to be fertilized, such that the bigger the regulated amount delivered to the regulating auger is, the bigger will be the measurement amount for the groups of dosing discs.

The dosing discs of each dosing group remain separated from each other by respective metal washers, materializing independent hollows to place the "single fertilizer" granules.

Rotary movement is transmitted to the first axle of the dosing discs from the respective crank disk to which the ground engaging means transmit movement.

Movement is transmitted from a same crank disk to the regulating auger and to the dosing means associated to the same hopper.

Moreover, the pinion associated to the corresponding connecting rod which engages with the internal gearing of the circular crown body joined to the respective crank disk in eccentric position, can be positioned varying its eccentricity and, therefore, the alternative stroke of the connecting rod for the regulation of the regulating auger depending on the desired dose to be delivered.

On the other hand, the alternative blocking, in the corresponding regulating auger, of the third and fourth gearwheels which engage with the pair of racks joined to the connecting rod body, cause the rotary movement of the same in an intermittent way, accelerating in speed from zero to the maximum speed allowed by the regulation and then slowing down until zero speed. Since this effect is repeated depending on the revolutions of the crank disk, its visual appreciation is practically irrelevant, but it gets the regulating auger to download the granulated single fertilizer gradually, which favors its distribution.

In the same way, the pinion associated to the corresponding connecting rod has an anti-turn blocking mechanism, which can be unblocked to carry out the regulation with fifty possibilities and a dead center and staying blocked during the normal operation of the machine.

Thus, the anti-turn blocking mean of the pinion associated to the corresponding connecting rod is defined by a rotary clamp, eccentrically mounted, which acts on the axle of the pinion itself, whose axle is conically finished off and associated to a lever body, in a similar way, presenting springs between it and an exterior washer.

To complement the description that will now be made, and with the intention of providing a better understanding of the characteristics of the invention, a set of plans accompanies the present specification, in whose figures the most characteristic details of the invention are depicted, in an illustrative and non-limitative way.

BRIEF DESCRIPTION OF THE DESIGNS

DESCRIPTION OF A PREFERRED EMBODIMENT

In view of the commented figures and according to the numbering adopted, it can be observed how the product dosing system for agricultural machines has an special application in fertilizing machines 1, which have, at least, a reservoir 2 into which three hoppers 3, 3' and 3" are materialized for placing the single fertilizer 29 (nitrogen, phosphorus and potassium), one in each one of them independently, as well as ground engaging means 4 based on a "field wheel" from whose axle movement will be transmitted to the product regulation and dosing means.

Thus, the transmission of movement from the axle of the "field wheel" of the ground engaging means 4 is based on axles 6 and gears 7 to distributors 5 which transmit movement to the regulation and dosing means of each single fertilizer contained in each one of the hoppers 3, 3' and 3".

Each one of the hoppers 3, 3' and 3" has regulation and dosing means, the regulation means being based on a regulating auger 8 and the dosing means being based on a first axle 9 with a series of groups of dosing discs 10 provided, in their periphery, with a plurality of notches or cuts 11, in an axial direction, whose group of discs 10 remained lodged in respective housings 12 into which the single fertilizer granules 29 are poured, delivered to the regulating auger 8 from the exit of the corresponding hopper 3, 3' and 3".

Figure 5:
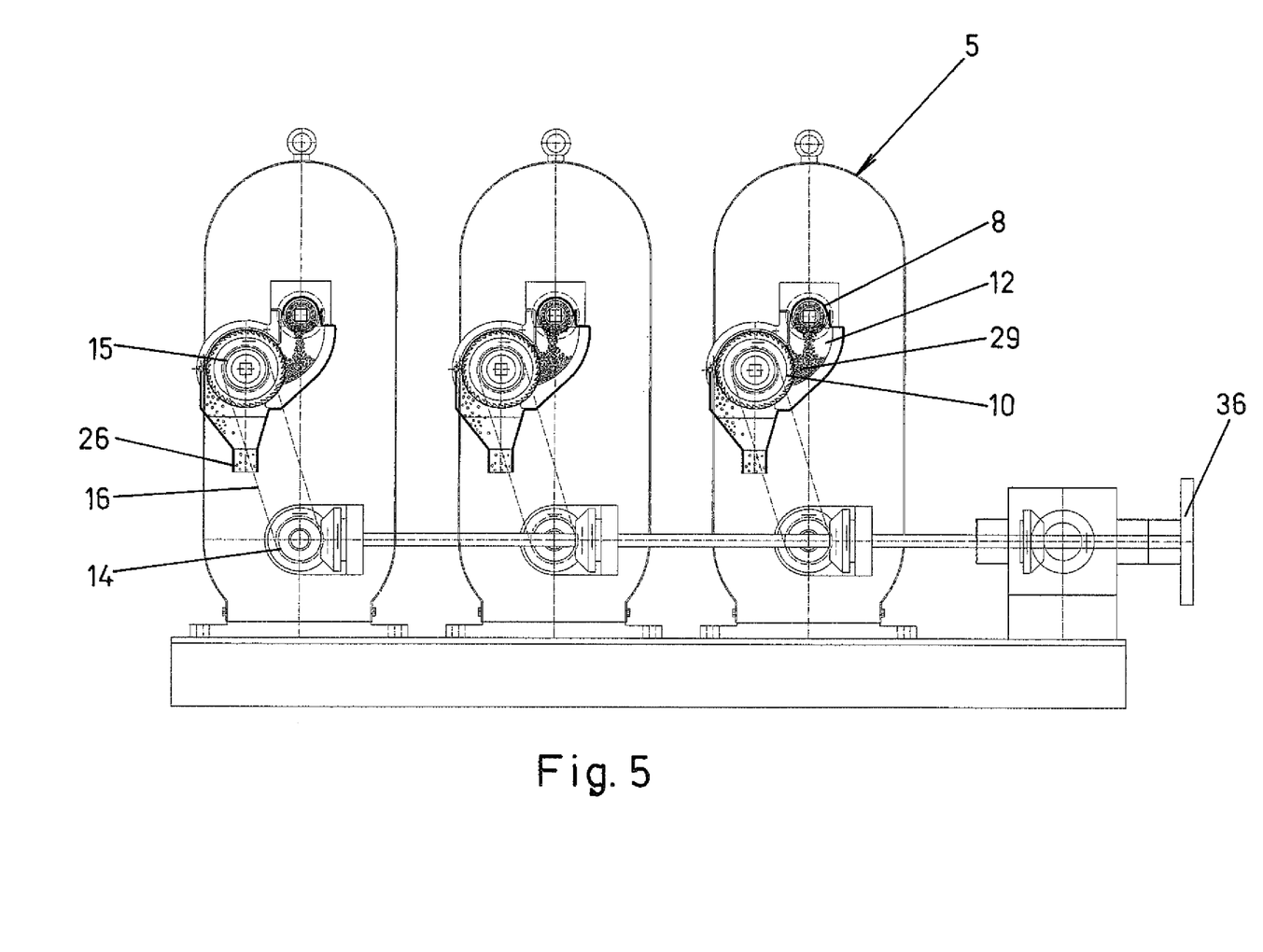
FIG. 5. It shows a selected view according to the plan A-A of the previous figure, wherein it can be observed how the corresponding regulating augers, associated to each one of the three hoppers, start pouring the corresponding single fertilizer towards the respective dosing means.

In addition, since the fertilizer machine 1 can have several deposit bodies 2 with three hoppers 3, 3' and 3" materialized in each one of them, each one of the hoppers 3, 3' and 3" is associated to the corresponding regulating auger 8 and to the corresponding group of dosing discs 10, therefore, there will be three regulating augers 8 and three first axles 9 with their corresponding groups of dosing discs 10, that is to say, each regulating auger 8 is associated to the corresponding first axle 9 carrying the series of groups of dosing discs 10, as can be observed in FIG. 5 of the designs.

In this way, movement will be transmitted from the distributors 5 to the regulating auger 8 and to the first axle 9 of the series of groups of dosing discs 10, relative to each one of the hoppers 3, 3' and 3", for which the distributors 5 include a respective crank disk 13, rotary with respect to a second axle 31, to which movement is transmitted from the ground engaging means 4, such that with the intention of simplifying the description and since the structure of the three distributors is identical, the description of a distributor 5 will be made. These distributors 5, like a closet with its corresponding door 30 to stay protected, lodge the movement transmission means, as has been indicated.

Thus, on the one hand, the second axle 31 for turning the crank disk 13 mounts a first gearwheel 14 and the first axle 9 of the series of groups of dosing discs 10 mounts a second gearwheel 15 between which a chain 16 is mounted to transmit movement to them, while, on the other hand, a connecting rod 17 is linked to the crank disk 13 to transmit movement to the regulating auger 8.

To this end, the crank disk 13 includes a circular crown body 18 with an interior gearing and mounted in eccentric position, to whose circular crown body 18 a disc body 19 is associated, also in eccentric position to the crank disk 13, and in whose circular crown body 18 the pinion 20 engages associated to the connecting rod 17 and that will transmit movement to the same, causing an alternative movement and through which the movement is transmitted to the regulating auger 8.

Figure 6:
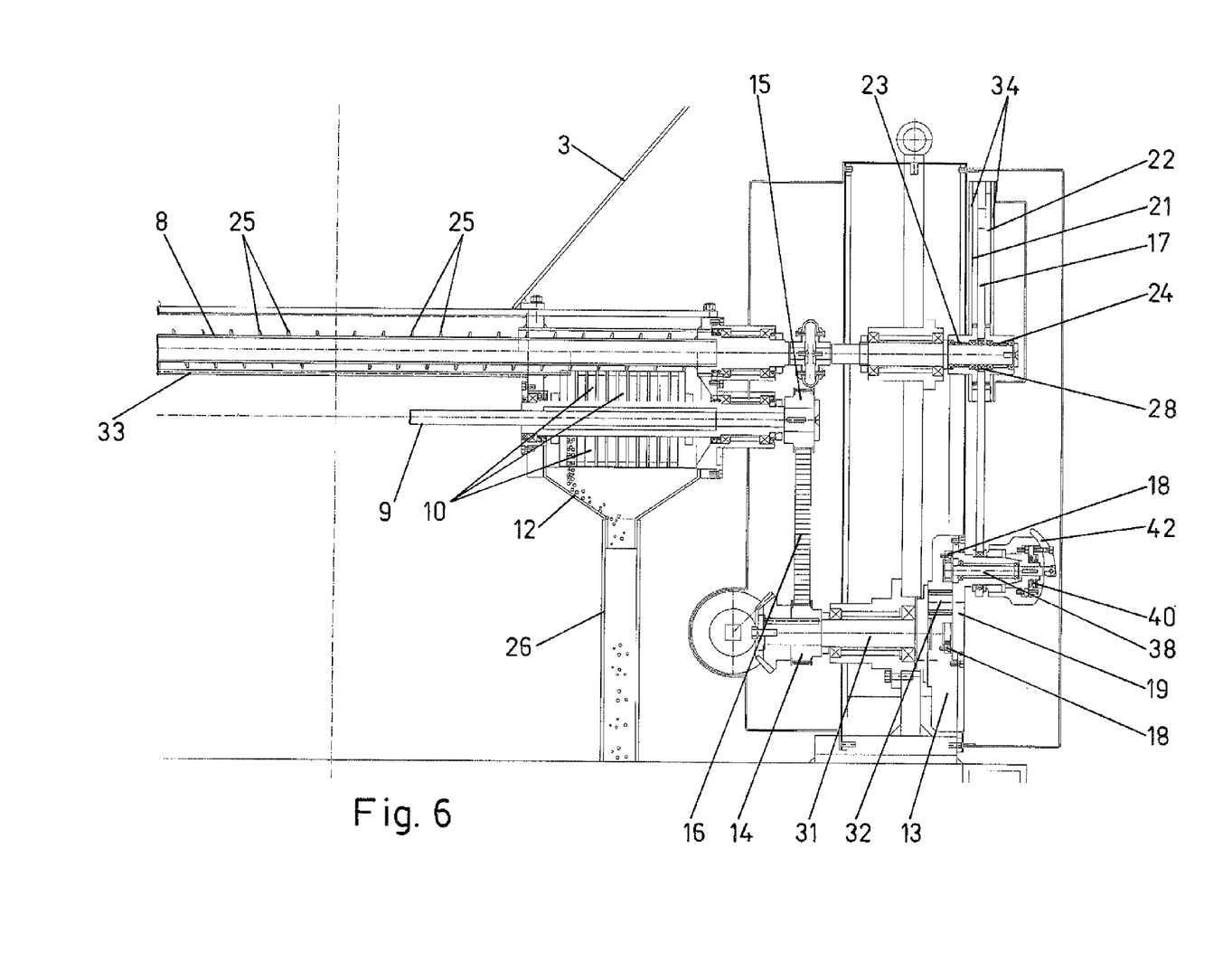
FIG. 6. It shows a schematic view of dosing means and of the means for transmitting movement to the corresponding regulating auger and to the respective first axle carrying the series of groups of dosing discs.

A pair of racks 21 and 22 are fixed to the said connecting rod, one in each side, such that, the said connecting rod 17 stays linked to the crank disk 13 by means of the pinion 20 engaged with the interior gearing of the circular crown body 18, while the transmission of movement to the regulating auger 8 is carried out through a third gearwheel 23 and a fourth gearwheel 24 mounted on the regulating auger 8, as can be observed in FIG. 6 of the designs.

The pair of racks 21 and 22 are fixed to both sides of the connecting rod 17 and their gearings are parallel to the longitudinal axis of the same towards the slanted hole 27 and each gearing corresponds to a third and fourth gearwheels 23 and 24.

This arrangement favors that when displacing the connecting rod up or down, the third and the fourth gearwheels 23 and 24 turn in the opposite direction, such that an (ascending) movement, when one of them is blocked, makes the regulating auger 8 turn, while the other gearwheel turns freely in the opposite direction, whilst in the other (descending) movement is quite the opposite, the gearwheel that was blocked turns freely and the gearwheel that was turning freely is blocked, causing the regulating auger to turn in the same direction.

Thus, the said third and fourth gearwheels 23 and 24 have an anti-turn device that allows them to turn only in one direction, being blocked in the other direction.

On the other hand, the alternative blocking, in the regulating auger 8, of the third and fourth gearwheels 23 and 24 which engage with the pair of racks 21 and 22 joined to the body of the connecting rod 8, cause the rotary movement of the same in an intermittent way. When accelerating from zero speed to the maximum speed allowed by the regulation and then slowing down to zero speed.

Since this effect is repeated depending on the revolutions of the crank disk 13, its visual appreciation is practically irrelevant, but it gets the regulating auger 8 to download the granulated single fertilizer gradually, which favors its distribution.

Moreover, the connecting rod 17 presents a slanted hole 27 into which a bearing 28 engages, mounted on the regulating auger 8 for its perfect conduction in its alternative displacement.

On the other hand, the regulation of the single fertilizer 29 outlet from the hoppers 3, 3' and 3" is carried out by regulating the eccentricity of the pinion 20 associated to the connecting rod 17, with which the stroke of the connecting rod 17 is regulated in its alternative movement and, thus, to this end the pinion 20 presents a blocked working position and a manual unblocking position for its regulation, which is carried out when the said pinion 20 is displaced over the internal gearing of the circular crown body 18, whose execution will be shown below.

According to what has been indicated, thanks to the turning movement of the regulating auger 8 the single fertilizer 29, contained in the respective hopper, is delivered through helical flanges 25 joined to the same, such that said helical flanges 25, arranged with relation to the corresponding hoppers 3, 3' and 3", are materialized in the two directions, so that when they turn, the single fertilizer 29 that is pulled is displaced in the two directions towards respective housings 12 for lodging the series of groups of dosing discs 10.

In this way, the single fertilizer 29 that has been poured into the corresponding housings 12 for lodging the series of groups of dosing discs 10 by turning the same starts to be removed and conducted to the outlet conduits 26 since the granules are being placed on its periphery notches or cuts 11.

Figure 11:
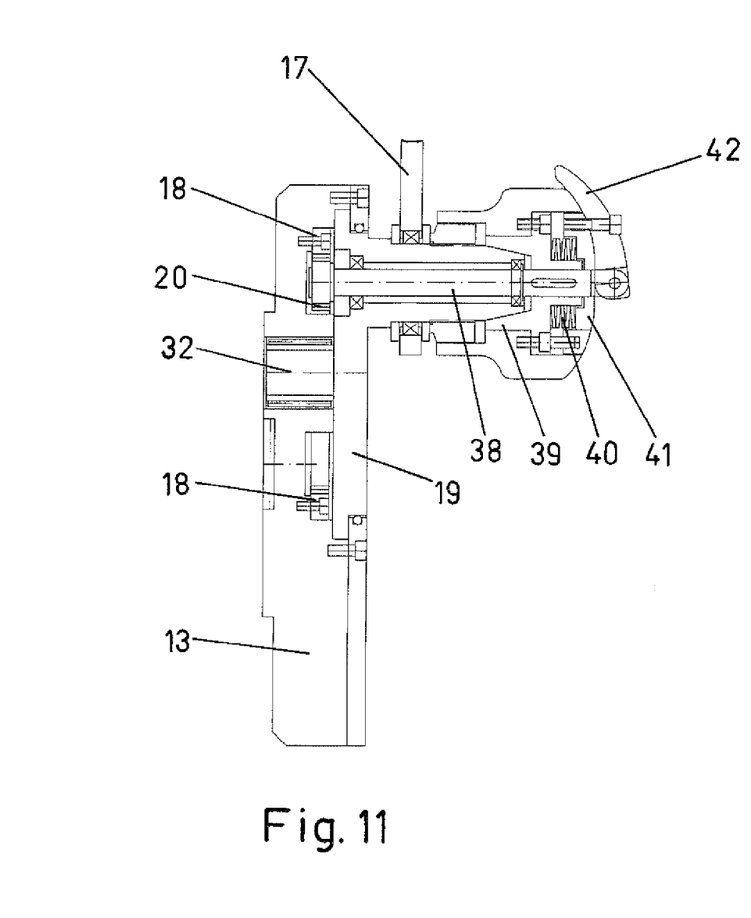
FIGS. 11 and 12 show a first and second exploded views of a crank disk, wherein the circular crown body, eccentrically mounted, the pinion engaged with its internal surface and the eccentric disc can be observed, as well as the manual activation lever for the regulation with the displacement of the pinion, in its anti-turn blocking and unblocking position.
Figure 12:
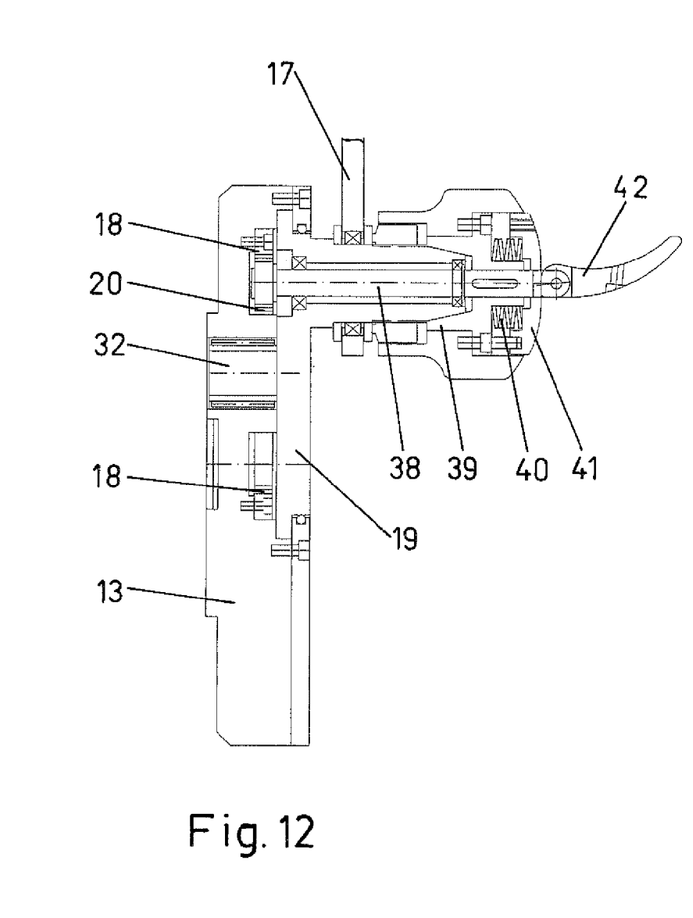
Figure 13:
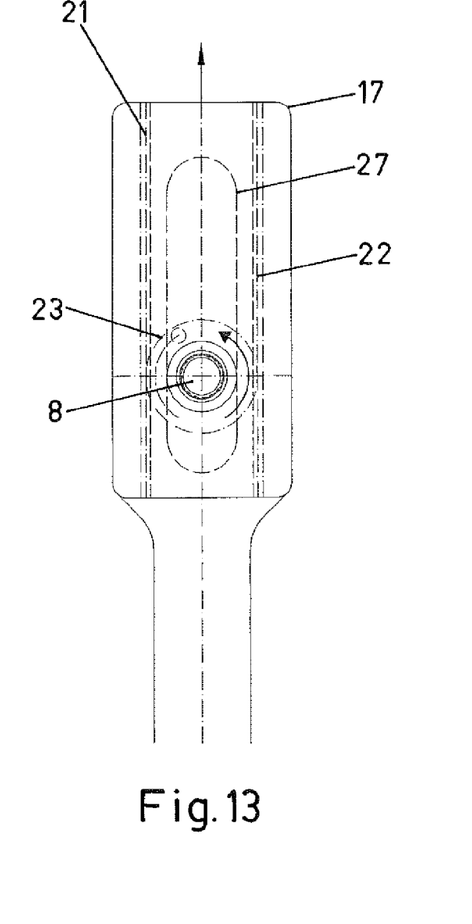
FIGS. 13 and 14 show a first and second in detail views of the connecting rod in two different positions of its alternative ascending/descending stroke in which a second or first gearwheel is blocked, engaged with a pair of racks joined to the connecting rod in both sides.
Figure 14:
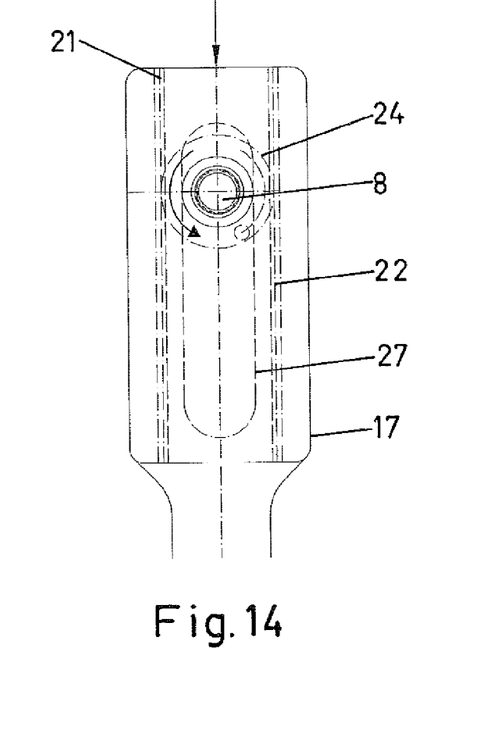

Lastly, the regulation of the pinion 20 associated to the connecting rod 17 is carried out when unblocking the blocking/unblocking means that act on the fourth axle 38 of the said pinion 20, for which said fourth axle 38 is conically finished off, as can be seen in FIGS. 11 and 12 of the designs, and fits into a void, similarly, of the lever body 39 over which a spring 40 acts, which, in turn, propels a washer 41 on which the blocking clamp 42, eccentrically mounted, acts and puts pressure.

Thus, in the blocking position, the eccentric clamp 42 puts pressure on the axle 38 of the pinion itself and on the washer 41, forcing the spring 40 to put pressure on the lever body 39 blocking the axle 38 of the pinion 20, while in the unblocking position, as can be seen in FIG. 12 of the designs, it will be possible to use the lever body 39 to turn the pinion 20 and, with that, the disc body 19 will also turn with respect to the third axle 32 of the same, which also causes the displacement of the connecting rod 17 changing its eccentricity, allowing the same to be seen thanks to the arrow 37 of the disc body 19 and to the graduation marked in the crank disk 13.

When the eccentricity of the pinion 20 varies, the stroke of the connecting rod 17 varies in its alternative movement and, with that, the regulation of the regulating auger 8 is achieved, regulating the delivery of the single fertilizer 29 towards the corresponding regulating auger 8.

In this way, a certain number of regulations can be performed such as, for example, fifty, duly highlighted in the crank disk 13 with the collaboration of an indicative arrow marked on the eccentric disc, and there is also the additional advantage of being able to have a "dead center" position "0" in which the rotation of the pinion 20 matches with the rotation of the circular crown body 18, such that when arranging the distributor in this point, the connecting rod is not displaced and does not transmit any movement at all, due to which the corresponding regulating auger 8 does not turn either, which is of great importance since this could be the way to proceed in those cases in which not providing a single fertilizer can be of interest.

That is to say, in the "0" position of "dead center" the distributor does not act and allows to let inactive the distribution and dosing elements related to the hopper that is to be disabled, even if it has fertilizer. Thus, the machine allows the application of one, two or three nutrients per furrow.

On the other hand, the fertilizing machine 1 and the regulation and dosing system will also allow to use fertilizer mixed with inert matter, for which it will suffice with placing the same in the three hoppers and perform the desired regulation, wherein it is advisable that the three distributors are regulated with the same measurement so that the products of the hoppers will run out all at once.

Figure 1:
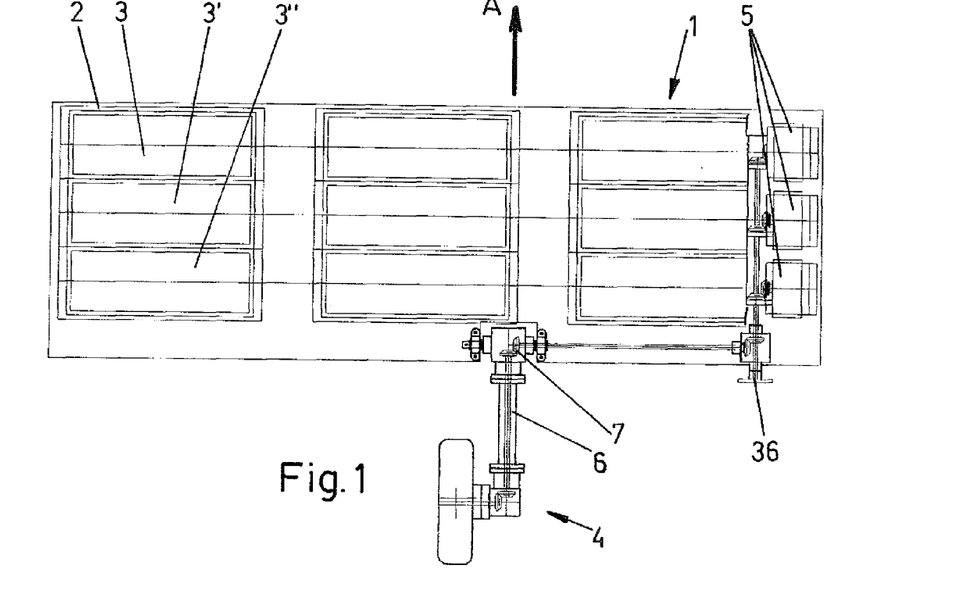
FIG. 1. It shows a schematic plan view of a fertilizing machine provided with three deposit bodies into which three hoppers are materialized, one for each single fertilizer (nitrogen, phosphorus and potassium) and wherein it can be observed how it has ground engaging means for the transmission of movement with the advance of the machine.

With the intention of clarifying other elements of lesser importance of the system, a reference will now be made to the accompanying figures, such that according to FIGS. 1 and 2, it can be seen how the fertilizing machine 1 will be displaced in the direction of the arrows "A" and the same has three deposit bodies 2 with three hoppers 3, 3' and 3" materialized in each one of them.

Figure 2:
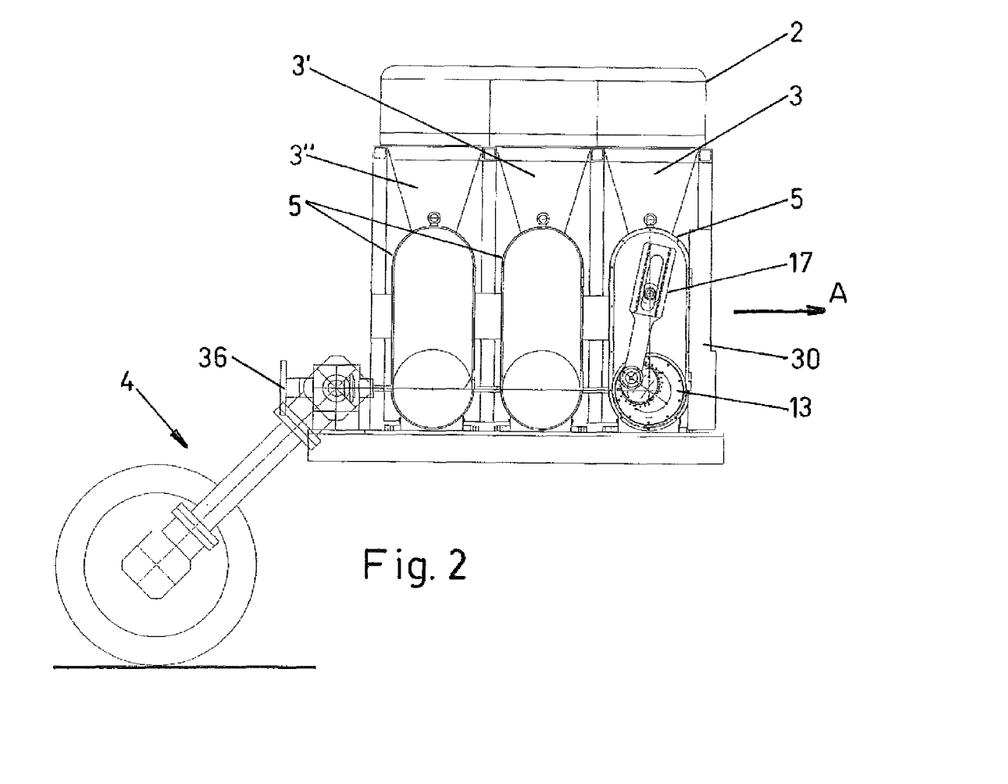
FIG. 2. It shows a side top view of the fertilizing machine of the previous figure, wherein the location of the movement distributors for the regulating augers and for the dosing means can be observed and having depicted a crank disk to which movement is transmitted from the ground engaging means and which remains linked to a connecting rod for the transmission of movement to the corresponding regulating auger.

Likewise, it can be seen how the fertilizing machine 1 has three distributors 5, observing one of them in FIG. 2 with its door 30 open, allowing the connecting rod, which will transmit movement to the regulating auger 8, to be observed.

Figure 3:
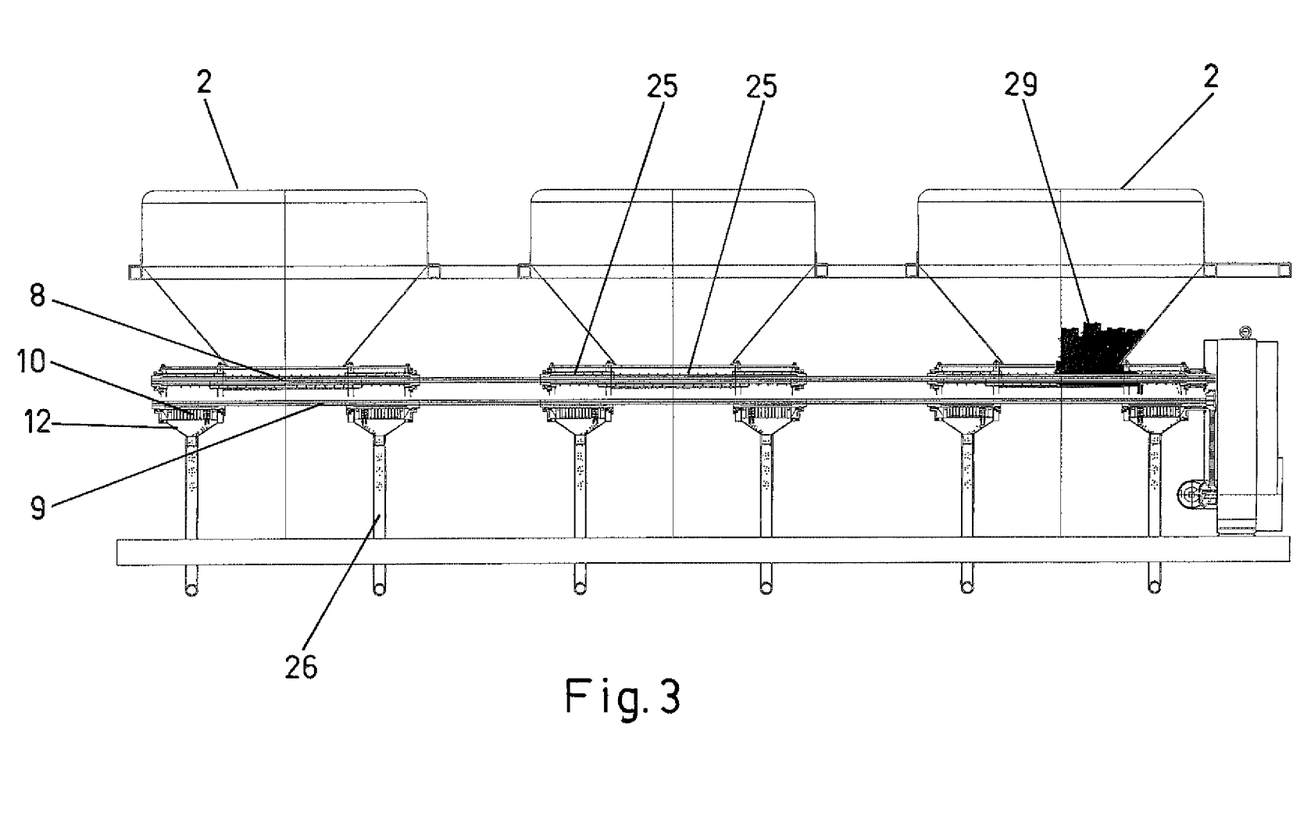
FIG. 3. It shows a frontal schematic view of the three deposit bodies into which three hoppers are materialized, arranged in the same order, with an auger to regulate one of the fertilizer components and the respective dosing means based on a first axle with a series of groups of discs in its periphery provided with notches or cuts.

In FIG. 3 of the designs, it can be seen how the section of the regulating auger 8 related to each hopper presents helical flanges 25, in two opposite directions, directing each of the single fertilizers 29 delivered to the corresponding regulating auger 8 to a pair of housings 12 which lodge respective groups of dosing discs 10.

Thus, in the practical execution depicted, the fertilizing machine 1 is for three furrows of culture plants corresponding to the longitudinal axis of the deposit bodies 2 and the single fertilizer will be directed to both sides of the same by means of the conduits 26 that will supply each of the single fertilizers contained in the hoppers 3, 3' and 3".

Figure 4:
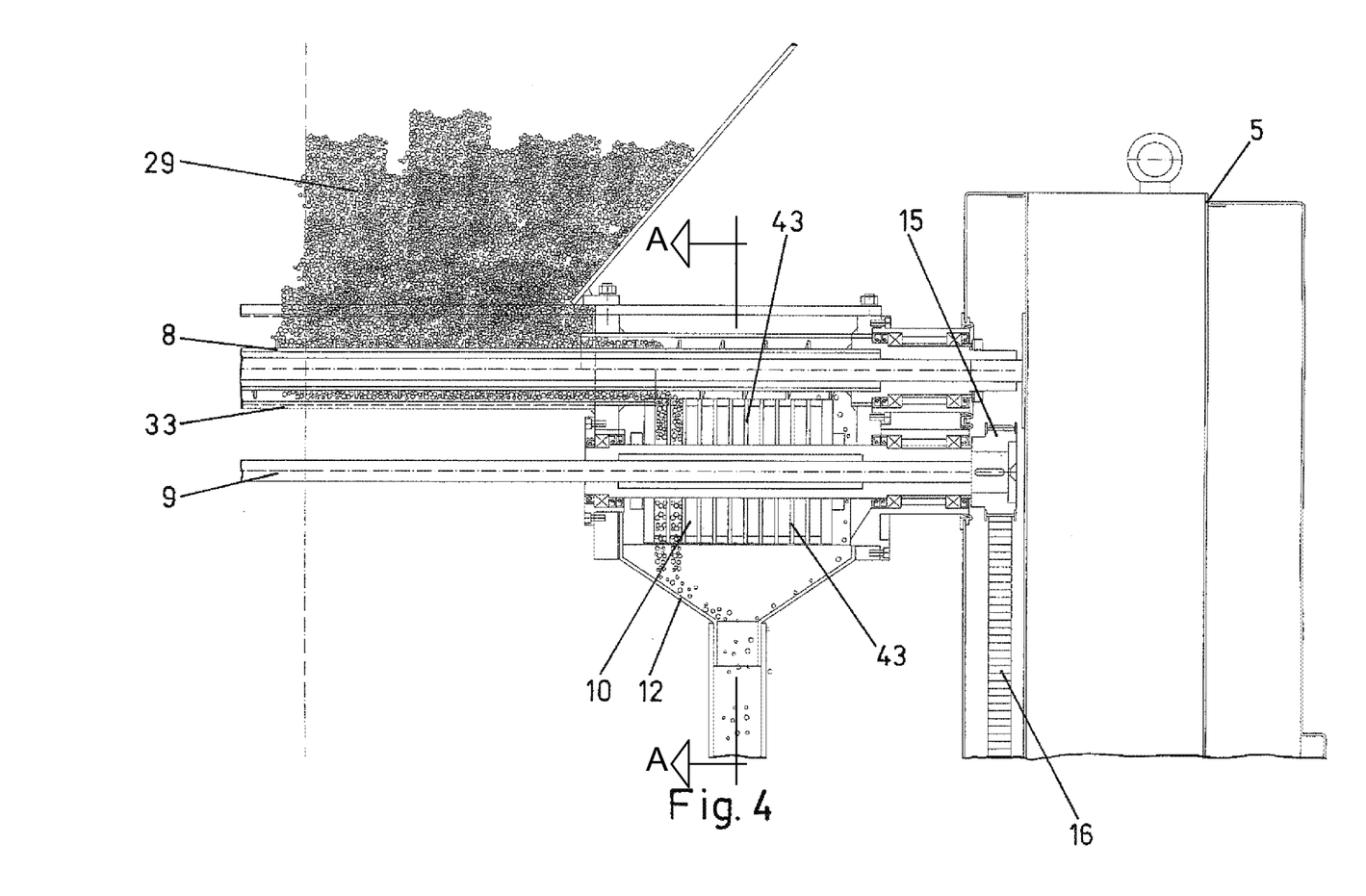
FIG. 4. It shows an in detail schematic view of the conduction of a single fertilizer, through the corresponding regulating auger to the dosing means.

In FIG. 4, it can be seen with detail how the regulating auger 8 conducts the corresponding single fertilizer 29 delivered to the respective hopper to a housing 12 to be extracted from the same by the group of dosing discs 10, for which the regulating auger 8 is associated to a lower body 33 with respect to which the single fertilizer 29 is displaced to the housing 12.

Likewise, it can be seen how the discs 10 are separated by metal washers 43 that collaborate in the configuration of the hollows materialized by its periphery notches or cuts.

In FIG. 5 of the designs, it can be seen how a housing 12 and the corresponding group of dosing discs 10 are associated to each regulating auger 8, wherein it can be observed that the product 29 is conducted by the regulating auger from the hopper to the housing 12 and from there to the outlet conduit by means of the group of dosing discs 10.

In FIG. 6 of the designs, in addition to a housing 12 with its group of dosing discs 10 and the section of the regulating auger 8 associated to it, the elements distributing the movement transmitted by means of the ground engaging means to the regulating auger and to the first axle 9 of the series of groups of dosing discs 10 can be observed.

In the same way, it can be observed how the pair of racks 21 and 22 together with the connecting rod 17 remain hooked by a pair of gussets 34 that strengthen them and prevent them from moving.

Figure 7:
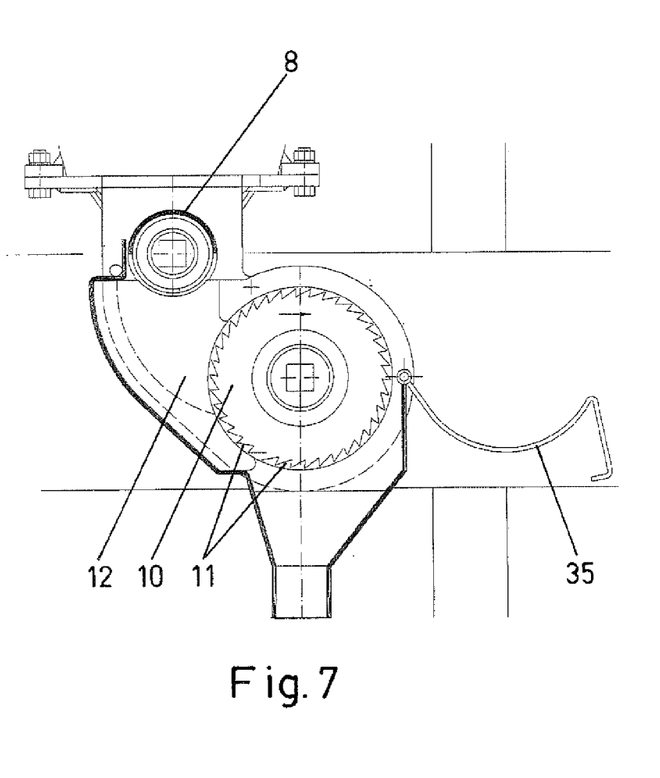
FIG. 7. It shows a selected view of a regulating auger and a dosing disc, lodged in its corresponding housing, wherein the notches or cuts made can be observed, which define the placement hollows of the single fertilizer granules for its measured pouring to the soil to be fertilized.

FIG. 7 shows a detail of a dosing disc 10 with its periphery notches or cuts, as well as a closing cap 35 for the housing 12 that, with its opening, will allow accessing the interior of the same in case of need.

Figure 8:
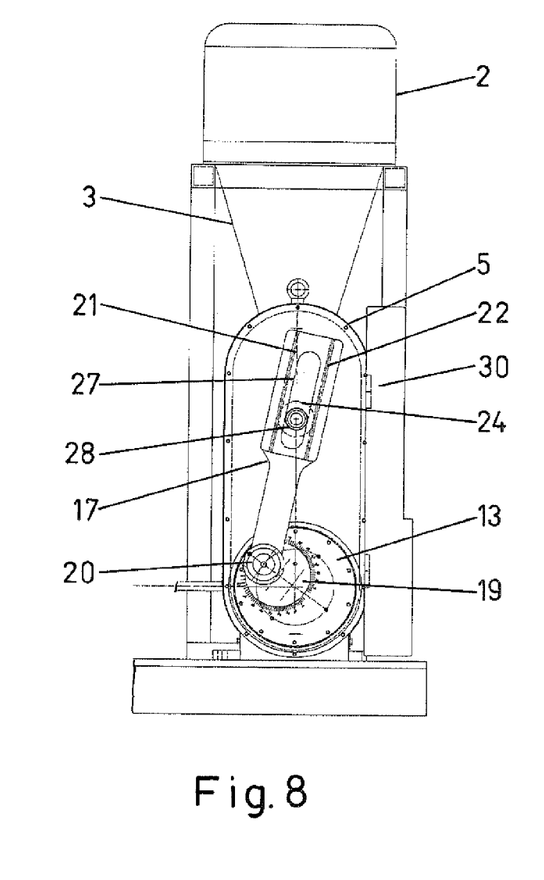
FIG. 8. It shows a top view of the means for transmitting movement to a regulating auger, the crank disk to which the ground engaging means transmit movement having to this end a circular crown body, not depicted, with a gearing in its internal surface and arranged in eccentric position and in whose gearing a pinion engages associated to a connecting rod which, in its alternative displacement, transmits movement to the corresponding regulating auger.

In FIG. 8, a top view of a distributor with its door 30 open can be observed, making possible to see how the connecting rod 17 is linked to the crank disk 13 that will transmit alternative movement to it and whose connecting rod will transmit movement to the corresponding regulating auger 8.

Figure 9:
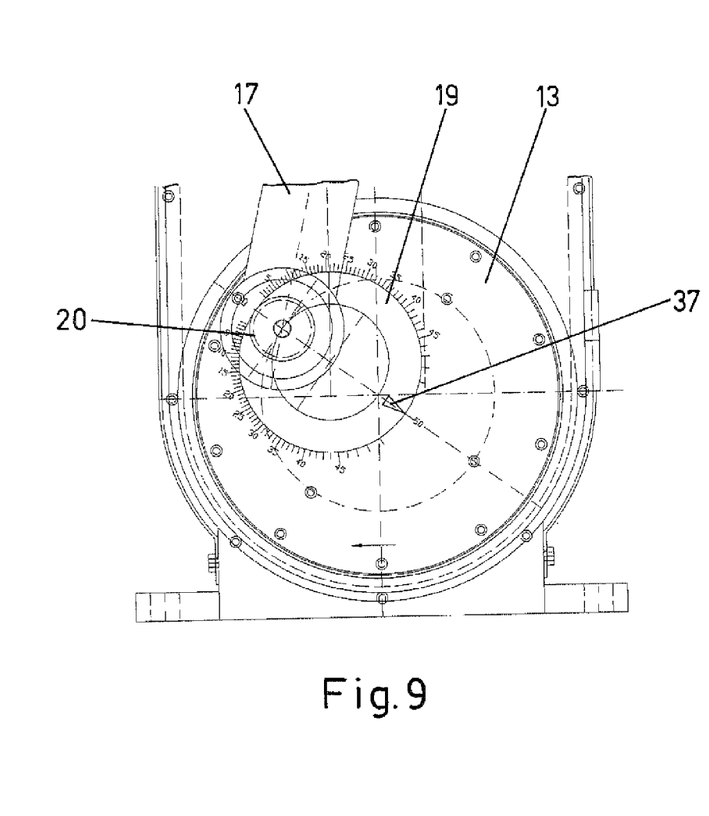
FIGS. 9 and 10 show an in detail first and second views of the crank disk to which movement is transmitted by the ground engaging means and whose crank disk includes an eccentric disc body, as well as a circular crown body with a gearing within, where a pinion engages associated to the connecting rod, wherein the regulation graduation marked in the crank disk in relation to the periphery of the eccentric disc and how the expected regulation is different in both of them can be observed.
Figure 10:
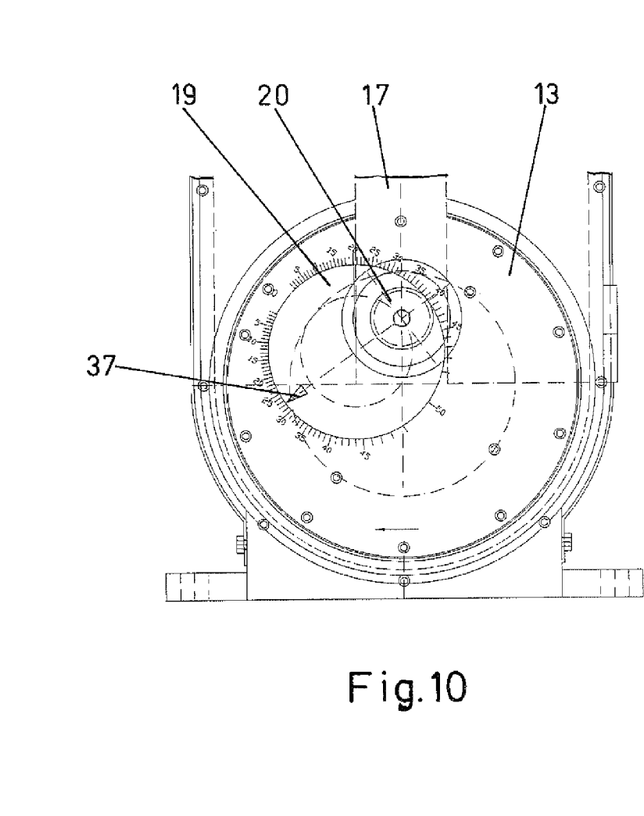

In FIGS. 9 and 10 of the designs, the crank disk 13 can be observed in detail, to which the ground engaging means 4 transmit movement with the pinion 20 associated to the connecting rod 17 according to two regulation positions, wherein it is possible to see how the arrow 37 marked in the disc body 19, mounted in eccentric position to the crank disk 13, shows two different numbers about the graduation marked in the crank disk 13.

In the graduation marked in the crank disk 13, it can be observed how it goes from "0" as "dead center" to fifty as maximum regulation.

Lastly, FIGS. 11 and 12 of the designs show the pinion 20 blocking/unblocking mechanism associated to the connecting rod 17 to allow its regulation.

On the other hand, in order to facilitate the maintenance and cleaning service, the wheel 36 allows turning the ground engaging system which, in turn, will activate the second axle 31 of the crank disk 13 and the first axle 9 of the regulation and dosing elements, with the machine not running.

An important advantage of the system object of the invention is that it allows the user "on the field" to perform the most convenient formulations, using the three basic components, which significantly reduces buying, transporting and storing the product.

The invention claimed is:

1. A product dosing system for an agricultural machine comprising ground engaging means for the transmission of movement to a dosing auger, said dosing system comprising:
   at least one reservoir (2) divided into three independent hoppers (3, 3' and 3") each for storing a different type of granulated single fertilizer (29);
   ground engaging means (4) associated to the agricultural machine (1) itself that transmit a rotary movement to crank disks (13) to be operably connected with the ground engagement means such that rotary movement can be transmitted to the crank disks (13);
   connecting rods (17) respectively linked to the crank disks (13);
   a regulating auger (8) associated to each one of the independent hoppers (3, 3' and 3"), to which a displacement of the corresponding connecting rod (17) transmits rotary movement associated to the respective crank disk (13) to which movement is transmitted from the ground engaging means (4);
   each of the connecting rods (17) having a slanted hole (27) into which a bearing (28) engages, the bearing (28) being mounted on the corresponding regulating auger (8), wherein the slanted hole (27), the bearing (28) and the regulating auger (8) make up a guiding configuration for each of the connecting rods (17);
   dosing parts respectively associated to each the independent hoppers (3, 3' and 3") and defined by a first axle (9) with groups of dosing wheels lodged in corresponding housings (12) in which the single fertilizer (29) is poured, dosed by the corresponding regulating auger (8), the dosing discs (10) being provided in their periphery with a plurality of notches or cuts (11), rotary movement being transmitted to the first axle (9) of the dosing discs (10) from the respective crank disk (13);
   a circular crown body (18) with an internal gearing integrally joined to the respective crank disk (13), in eccentric position;
   a disc body (19) associated to the circular crown body (18), also in eccentric position to the respective crank disk (13);
   a pinion (20), associated to the corresponding connecting rod (17), which engages with the internal gearing of the circular crown body (18), said pinion (20) being coupled to the disc body (19);
   a pair of racks (21 and 22) integrally associated with the corresponding connecting rod (17), one on each side, into which first and second gearwheels (23 and 24) respectively engage, so that during vertical up and down displacement of the connecting rods (17) the gearwheels alternately rotate in opposed directions, one freely and the other forcing the rotation of the regulating auger (8); and
   a blocking part for the pinion (2), associated to the corresponding connecting rod (17), so that the pinion (2) can be blocked in a certain position after regulation has taken place.

2. A product dosing system, according to claim 1, wherein each one of the hoppers (3, 3' and 3") is associated to one of the regulating augers (8) and to one of the dosing parts.

3. A product dosing system, according to claim 1, wherein the ground engaging means (4) associated to the machine (1) comprises a wheel, whose rotation movement is transmitted, by a series of axles (6) and gears (7) to the corresponding crank disk (13), to which the connecting rod (17) is linked, said crank disk (13) rotating about a second axle (31).

4. A product dosing system, according to claim 1, wherein the regulating auger (8) associated to each one of the hoppers (3, 3' and 3") for delivering the single fertilizer (29) includes two sections with helical flanges (25) turnable, in opposite directions, to transport the single fertilizer (29) towards two different dosing housings (12).

5. A product dosing system, according to claim 1, wherein the notches or cuts (11) at the periphery of the dosing discs (10) constitute the spaces for collecting the fertilizer that they can from there be distributed through a conduit (26) to the soil to be fertilized.

6. A product dosing system, according to claim 5, wherein the series of dosing discs (10) of each group of discs are separated from each other by respective metal washers (43).

7. A product dosing system, according to claim 1, wherein for the transmission of movement from the crank disk (13) to the first axle (9), a third gearwheel (14) integrally joined to the second axle (31) of the crank disk (13) is provided, and a fourth gearwheel (15) integrally joined to the first axle is provided, said third and fourth gearwheels (14, 15) being linked by a chain (16) transmission.

8. A product dosing system, according to claim 1, wherein movement is transmitted from a same crank disk (13) to the regulating auger (8) and to the first axle (9) of the dosing part associated to each of the corresponding hoppers (3, 3' and 3").

9. A product dosing system, according to claim 7, wherein the pinion (20) associated to the corresponding connecting rod (17), engaged with the internal gearing of the circular crown body (18), and integrally joined to the respective crank disk (13) in eccentric position, can be positioned, varying its eccentricity with respect to the crank disk (13) and the stroke of the connecting rod (17), for the regulation of the regulating auger (8).

10. A product dosing system, according to claim 1, wherein the alternative blocking, in the corresponding regulating auger (8) of the first and second gearwheels (23 and 24) engaged with a pair of racks (21 and 22) joined to the connecting rod (17), transmit the rotary movement to the same with the alternative movement of the connecting rod (17).

11. A product dosing system, according to claim 1, wherein the blocking part associated to the corresponding connecting rod (17) is defined by an eccentric rotary clamp (42), which acts on a fourth axle (38) of the pinion (20), which fourth axle (38) is conically finished off and is connected to a lever body (39) biased by a spring (40) which also biases a washer (41).

* * * * *